(12) United States Patent
Wo et al.

(10) Patent No.: US 9,245,145 B2
(45) Date of Patent: Jan. 26, 2016

(54) METHODS AND SYSTEMS FOR REGULATING DATABASE ACTIVITY

(71) Applicant: salesforce.com, inc., San Francisco, CA (US)

(72) Inventors: Zhaogang Wo, Alameda, CA (US); Venkata Muralidhar Tejomurtula, Fremont, CA (US); Maryann Patel, San Francisco, CA (US); Fang Wong, San Francisco, CA (US); Atul Singh, Fremont, CA (US); Christopher Williams, Fremont, CA (US); Pawan Nachnani, Newark, CA (US)

(73) Assignee: salesforce.com, inc., San Francisco, CA (US)

( * ) Notice: Subject to any disclaimer, the term of this patent is extended or adjusted under 35 U.S.C. 154(b) by 336 days.

(21) Appl. No.: 13/789,011

(22) Filed: Mar. 7, 2013

(65) Prior Publication Data

US 2014/0019488 A1    Jan. 16, 2014

Related U.S. Application Data

(60) Provisional application No. 61/672,015, filed on Jul. 16, 2012.

(51) Int. Cl.
*G06F 17/30* (2006.01)
*G06F 21/62* (2013.01)
*G06F 21/55* (2013.01)
*H04L 29/06* (2006.01)

(52) U.S. Cl.
CPC .......... *G06F 21/6218* (2013.01); *G06F 21/552* (2013.01); *H04L 63/1425* (2013.01); *G06F 2221/2135* (2013.01)

(58) Field of Classification Search
CPC .......... G06F 17/30064; G06F 2201/81; G06F 2201/875; G06F 11/3466; G06F 11/3636; G06F 11/3452; G06F 2221/2137; G06F 21/6218
USPC ....................................................... 707/784
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

*Primary Examiner* — Debbie Le
(74) *Attorney, Agent, or Firm* — Ingrassia Fisher & Lorenz, P.C.

(57) ABSTRACT

Methods and systems are provided for regulating access to a database by a server. One exemplary method involves the server receiving one or more requests for an activity with respect to the database and determining an attempted usage for the activity over a monitoring period by a source of the requests. When the attempted usage exceeds an allowed usage of the activity for the monitoring period, the server provides a human verification test to the source and thereafter initiates the activity with respect to the database in response to receiving a satisfactory human verification response to the human verification test from the source.

18 Claims, 6 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,595,847 B2 * | 11/2013 | Petta ................ G06F 17/30864 709/229 |
| 8,627,407 B1 * | 1/2014 | Satish ................ G06F 21/36 709/229 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0154979 A1 * | 6/2008 | Saitoh et al. ................ 707/202 |
| 2009/0063415 A1 | 3/2009 | Chatfield et al. |
| 2009/0260068 A1 * | 10/2009 | Hariharan ................ H04L 9/32 726/7 |
| 2010/0250748 A1 * | 9/2010 | Sivasubramanian et al. .. 709/226 |
| 2010/0325706 A1 * | 12/2010 | Hachey ................ H04L 9/3271 726/6 |
| 2014/0047111 A1 * | 2/2014 | Petta ................ G06F 17/30864 709/224 |

* cited by examiner

METHODS AND SYSTEMS FOR REGULATING DATABASE ACTIVITY

CROSS-REFERENCE TO RELATED APPLICATION(S)

This application claims the benefit of U.S. provisional patent application Ser. No. 61/672,015, filed Jul. 16, 2012, the entire content of which is incorporated by reference herein.

TECHNICAL FIELD

Embodiments of the subject matter described herein relate generally to computer systems, and more particularly, embodiments of the subject matter relate to methods and systems for regulating the rate at which database activities may be initiated by a third party.

BACKGROUND

Many websites provide access to information that is hosted, stored, gathered, or otherwise maintained by that website operator. For example, an online retailer may provide users with a listing of products available for purchase along with a number of different types of metadata or other descriptive information associated with those products, which are maintained by that online retailer. However, publicizing this information exposes the website operator to web crawlers, scrapers, bots, or other automated systems attempting to gather information from the website operator. In addition to the computational resources consumed by the automated activity, a third party associated with the automated activity may also attempt to leverage the gathered information in a manner that may compromise the website operator's business objectives. At the same time, many existing techniques for preventing or otherwise discouraging automated activity can be intrusive or otherwise degrade the user experience for the legitimate customers of the website operator.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
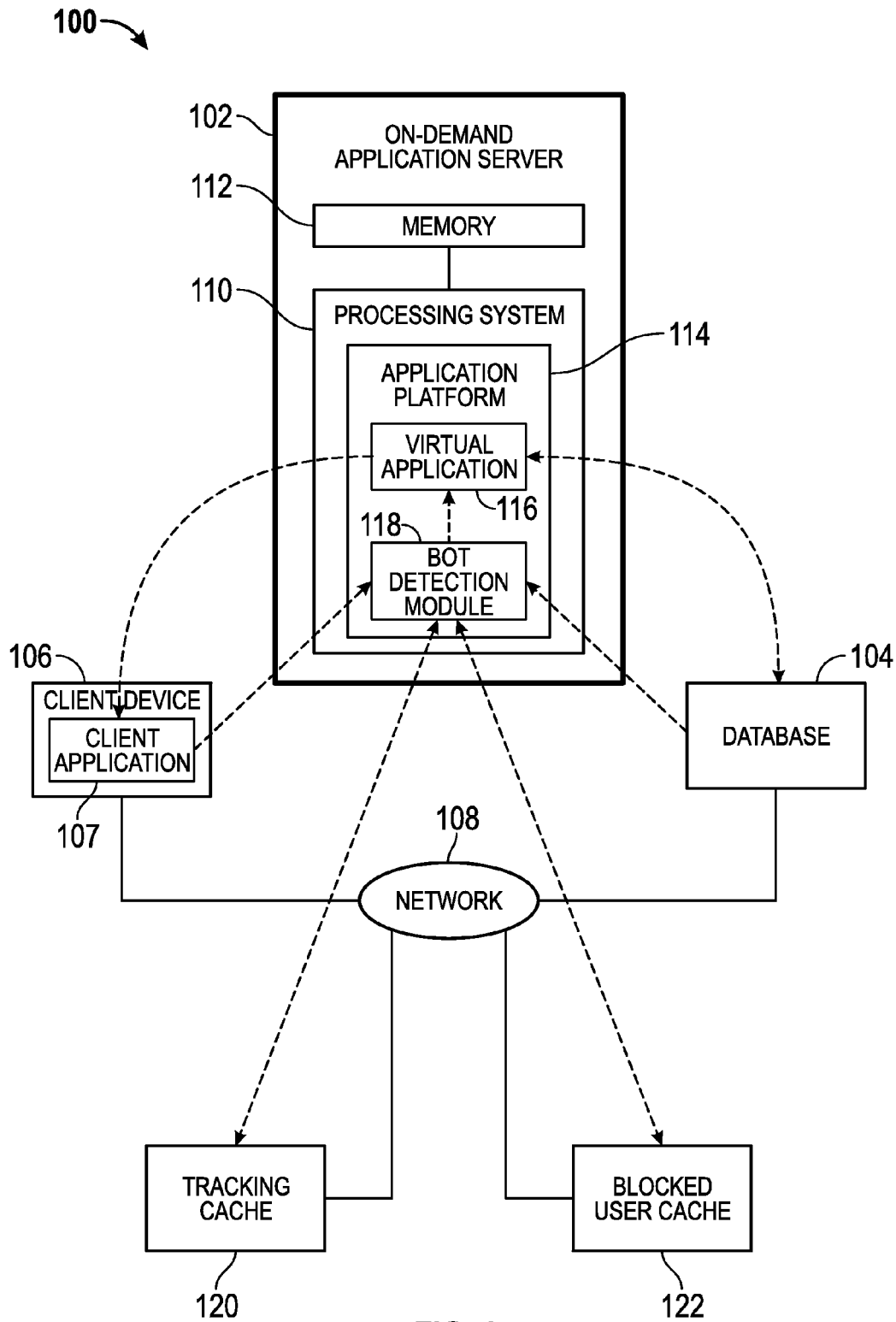
FIG. 1 is a block diagram of an exemplary computing system.

Embodiments of the subject matter described herein generally relate to regulating database activity in a manner that prevents, inhibits, or otherwise discourages web crawlers, scrapers, bots or other automated systems from persistently initiating a database activity over a prolonged period of time while minimizing the impact on the user experience for legitimate users requesting that database activity. As described in greater detail below, for a particular database activity (e.g., a login request, a search request, or the like), allowed usage rate limits are defined for different monitoring periods of different durations, wherein the allowed usage rate limits are chosen so that they are likely to be exceeded only by web crawlers, scrapers, bots, or other automated systems and unlikely to be exceeded by human users. When an attempted usage rate meets or exceeds an allowed usage rate limit for a particular monitoring period being enforced for a requested database activity, that requested database activity may only be initiated in response to receiving a successful human verification response. For example, a server may initiate a human verification test being provided to a source of a request when the source's attempted usage exceeds an allowed usage limit for a monitoring period, wherein the server only continues servicing the request with respect to the database in response to receiving a satisfactory response to the human verification test from the source of the request. In this manner, automated activity is constrained, prevented, or otherwise discouraged while allowing legitimate human activity to continue. In exemplary embodiments, the allowed usage rate limits are enforced for logged-in users, that is, users that have been previously authenticated by a server, an application, or the like that provides access to the database. However, while the subject matter may be described herein in the context of a logged-in user, it should be noted that allowed usage rate limits may also be defined and enforced for anonymous users (e.g., on the basis of a network address associated with the request) or for login requests.

As described in greater detail below, a server may receive a number of requests for a particular database activity from a number of different sources and maintain associations between requests and their sources to monitor or otherwise track each source's requests for that database activity. Depending on the embodiment, a source may be identified using a unique user identifier associated with a user of a computing device making the request, a network address (e.g., an internet protocol (IP) address or the like) of a computing device making the request, a session identifier associated with a request, or the like, and/or any combination thereof. The relationships between each source and its number of requests for that database activity are analyzed to determine a confidence interval for a number of requests per source within a monitoring time period that is chosen to capture requests that are likely to have been initiated by a human, that is, the confidence interval may be intended to encompass a majority (if not all) of the sources corresponding to legitimate human users. The upper limit of the confidence interval may then be used to define an allowed usage limit for that database activity over any duration of time equal to that monitoring time period. For example, the allowed usage limit may be chosen to be equal to a number of requests representing the ninety-fifth percentile for that monitoring period (i.e., a threshold number of requests where 95% of the sources make a number of requests for that database activity that is less than or equal to that threshold number of times over that monitoring period). In this regard, any attempted usage of a database activity that exceeds an allowed usage limit for a particular monitoring period is potentially (or likely) attributable to a web crawler, scraper, bot, or other automated system.

After an allowed usage limit for a database activity is determined for a particular monitoring period, when the server receives requests for that database activity from a particular source, the server tracks or otherwise monitors the requests from that source to determine whether the number of requests from that source over a preceding duration of time equal to the monitoring period is greater than or equal to the allowed usage limit for that monitoring time period. When the requesting source's attempted usage meets or exceeds the allowed usage limit of a requested database activity for a monitoring period, the server only initiates the requested database activity in response to receiving a successful (or satisfactory) human verification from the source. When the server receives an unsuccessful (or unsatisfactory) human verification from the source or otherwise fails to receive a successful human verification from the source, the source is prevented from subsequently initiating the requested database activity or causing the requested database activity to be performed for a desired amount of time. In this manner, a majority of (if not all) legitimate users may request the database activity without any impact on their user experience, while automated activity will be prevented from initiating a particular database activity an excessive rate. By using different monitoring periods and confidence intervals with different levels of confidence for those monitoring periods, the rate at which automated activity will be constrained to may be low enough to effectively discourage or otherwise defeat the purpose of any automated activity.

For example, in accordance with one or more embodiments, to request a particular type of search (or query) of a database, a server may require each user or other requesting entity initially create a unique user identifier or otherwise establish some sort of unique authentication credential, so that the user is authenticated by the server prior to being able to request the search. Accordingly, the server may maintain associations between search requests and the unique user identifier associated with the requests to determine a confidence interval for the number of requests per user within a monitoring time period, wherein the upper limit of the confidence interval defines an allowed usage limit for the number of search requests per user identifier over a duration of time equal to that monitoring time period. For example, the allowed usage limit may represent the ninety-fifth percentile for search requests over a one minute monitoring period (i.e., 95% of users request that number or fewer database searches over a duration of time equal to one minute). Once a user has been authenticated by the server (e.g., by verifying login information received from the user matches stored login information in the database), the server tracks or otherwise monitors the search requests originating from that logged-in user (e.g., using the user identifier) and determines whether the number of search requests from that logged-in user over a preceding duration of time equal to the monitoring period is greater than or equal to the allowed usage limit for search requests during that monitoring time period. For example, the server may determine whether the number of search requests from a logged-in user over the preceding one minute time interval is greater than the ninety-fifth percentile for the number of search requests per user over a one minute period.

When the counted number of search requests from a logged-in user meets or exceeds an allowed number of search requests for a preceding monitoring period, the server attempts to verify that the logged-in user is not a web crawler, scraper, bot, or the like by providing or otherwise initiating one or more human verification tests for the logged-in user. When the server receives a satisfactory (or successful) response to the human verification test, the server verifies the logged-in user as likely being a human user and initiates the search of the database in accordance with the received search request. In this regard, the user experience is only interrupted once a logged-in user's attempted usage of a particular database activity exceeds a threshold amount of usage that is likely to primarily be exceeded by web crawlers, scrapers, bots, or other automated systems. Conversely, when the server fails to verify the logged-in user is a human, the server may block or otherwise prevent searches of the database from being initiated in response to search requests associated with that user identifier.

Turning now to FIG. 1, an exemplary computing system 100 includes a server 102 that regulates activity with respect to a database 104 that is communicatively coupled to the server 102 via a communications network 108 such as a wired and/or wireless computer network, a cellular network, a mobile broadband network, a radio network, or the like. In exemplary embodiments, the server 102 receives requests for a particular database activity from one or more sources, such as, for example, users of one or more client devices 106 coupled to the network 108. It should be understood that FIG. 1 is merely one simplified representation of the computing system 100 provided for purposes of explanation and is not intended to limit the subject matter described herein in any way. In this regard, in practice, the computing system 100 may include multiple instances of the server 102 as needed to handle requests from any number of client devices. That said, for clarity and ease of description, the subject matter may described herein using the singular form when referring to the server 102 and/or the client device 106.

As described in greater detail below, the server 102 tracks or otherwise monitors the rate at which requests are received from the respective client devices 106 and/or users over various monitoring periods to detect or otherwise identify when the rate at which a respective client device 106 and/or user is requesting a particular database activity meets or exceeds an allowed usage rate for that database activity over a particular monitoring period. In this regard, while a respective client device 106 and/or user is requesting a particular database activity at a rate that is less than or equal to the allowed usage rate, the server 102 automatically initiates performance of that activity by the database 104 on behalf of the requesting client device 106 and/or user in accordance with the request. As described above, in exemplary embodiments, when a respective client device 106 and/or user requests a database activity at a rate that exceeds an allowed usage rate, the server 102 only initiates performance of the requested activity by the database 104 in response to verifying or otherwise confirming that the request is emanating from a human user as opposed to an automated system, bot, web crawler, scraper, or the like.

The server 102 generally represents a computing system or another combination of processing logic, circuitry, hardware, and/or other components configured to support the activity regulation processes described in greater detail below. In the illustrated embodiment, the application server 102 includes a processing system 110 and a data storage element (or memory) 112. The processing system 110 may be implemented using any suitable processing system, such as one or more processors, central processing units (CPUs), controllers, microprocessors, microcontrollers, processing cores and/or other computing resources configured to support the operation of the processing system 110 described herein. The memory 112 represents any non-transitory short or long term data storage or other computer-readable media capable of storing programming instructions for execution by the processing system 110, including any sort of random access memory (RAM), read only memory (ROM), flash memory, magnetic or optical mass storage, and/or the like. In accordance with one or more embodiments, the computer-executable programming instructions, when read and executed by the processing system 110, cause the processing system 110 to create, generate, or otherwise provide a bot detection module 118 that tracks or otherwise monitors requests received from client devices 106 and performs one or more additional tasks, operations, functions, and/or processes described herein in the context of the activity regulation process 200 of FIG. 2.

In accordance with one or more embodiments, the server 102 is realized as an on-demand application server, wherein computer-executable programming instructions stored by the memory 112 are executed by the processing system 110 to create, generate, or otherwise facilitate an application platform 114 that generates or otherwise provides a virtual application 116 at run-time (or "on-demand") based upon data stored or otherwise maintained by the database 104. The virtual application 116 is provided to a client device 106 via the network 108 and allows the user of the client device 106 to view, retrieve, analyze, create, delete, modify, or otherwise access the information and/or data maintained by the database 104. For example, the virtual application 116 may allow a user of the client device 106 to login to the virtual application 116 and access information and/or data that is made accessible to the user (based on the user's identifier) and initiate various activities with respect to the information and/or data in the database 104.

The client device 106 generally represents an electronic device coupled to the network 108 that is utilized by the user to access the application platform 114 and/or virtual application 116 on the server 102. In practice, the client device 106 can be realized as any sort of personal computer, mobile telephone, tablet or other network-enabled electronic device that includes a display device, such as a monitor, screen, or another conventional electronic display, capable of graphically presenting data and/or information provided by the application platform 114 and/or the virtual application 116 along with a user input device, such as a keyboard, a mouse, a touchscreen, or the like, capable of receiving input data and/or other information from the user of the client device 106. In the illustrated embodiment, the user manipulates the client device 106 to execute a client application 107, such as a web browser application, and contact the application server 102 and/or application platform 114 using a networking protocol, such as the hypertext transport protocol (HTTP) or the like. The application platform 114 authenticates or otherwise identifies the user and generates the virtual application 116 at run-time based upon information and/or data associated with the user maintained by the database 104. In this regard, the virtual application 116 includes code, data and/or other dynamic web content provided to the client device 106 that can be parsed, executed or otherwise presented by the client application 107 running on the client device 106. The virtual application 116 may provide graphical user interface (GUI) displays that include GUI elements or widgets adapted to allow the user to search, query, retrieve, analyze, create, delete, modify or otherwise access information and/or data maintained by the database 104. For example, the user may utilize the virtual application 116 to search or otherwise query the database 104 for records matching a particular search syntax or keyword(s), view and/or analyze the retrieved record(s), modify and/or delete the retrieved record(s), and the like.

Still referring to FIG. 1, in exemplary embodiments, the bot detection module 118 functions as a proxy for requests received by the server 102 and/or application platform 114 from the client device(s) 106. As described in greater detail below, the bot detection module 118 tracks or otherwise maintains the relationship between the requests and the requesting user and/or client device 106 and monitors or otherwise analyzes the requests for a particular database activity emanating from that user and/or client device 106 to ensure that user and/or client device 106 has not requested that particular database activity at a rate that exceeds an allowed usage rate for the requested database activity before providing the request to the virtual application 116 and/or database 104 for further handling. In this regard, when the user and/or client device 106 requests a database activity a number of times over a preceding period of time that exceeds the allowed number of requests over that monitoring period, the bot detection module 118 attempts to verify the user of the client device 106 rate as being a human user before providing the request to the virtual application 116 and/or database 104. In other words, when the user and/or client device 106 requests a database activity at an attempted usage rate that exceeds the allowed usage rate, the bot detection module 118 only provides the request to the virtual application 116 and/or database 104 in response to receiving a successful or satisfactory response to one or more human verification tests from the client device 106.

As described in greater detail below, in exemplary embodiments, to monitor requests received from various different users and/or client devices 106, the bot detection module 118 utilizes a tracking cache 120 that is coupled to the server 102 via the network 108. In this regard, in response to receiving a request for a database activity from a user and/or client device 106, the bot detection module 118 creates or otherwise generates an entry in the tracking cache 120 that maintains an association between information identifying the source of the request, information identifying the type of database activity requested, and the counted number of times that source has requested that database activity. In exemplary embodiments, the tracking cache 120 is realized as a distributed memory object caching system (e.g., an memcached caching system or the like), wherein the bot detection module 118 generates the key for each cache entry using the unique user identifier associated with the request, the requested database activity type, and time window value calculated based on the duration of the monitoring period for the requested database activity type and a current reference time for the server 102. For example, in one embodiment, the bot detection module 118 calculates the time window value by dividing a current reference time for the server 102, such as the current UNIX time, by a duration of the monitoring period, performing a modulus operation on the quotient, and using the residue of the modulus operation as the time window value. For example, to allow the time window value to be represented using only one byte of information, the time window value may be determined as the residue of the quotient of the current reference time divided by the monitoring period modulo 128 (e.g., '(current_reference_time/monitoring_period) mod 128'). For subsequent requests for that same database activity received from the same user, the bot detection module 118 generates the cache key and locates the corresponding entry in the tracking cache 120 having a key that matches the generated cache key, increments the counted number of requests associated with that matching entry, and compares the counted number of requests for that database activity from the user to the allowed number of requests for that database activity for the monitoring period used to calculate the time window value. When the counted number of requests is less than the allowed number of requests, the bot detection module 118 provides the request to the virtual application 116 to initiate or otherwise perform the requested database activity on behalf of the requesting user. Once an amount of time corresponding to the monitoring period has elapsed, the calculated time window value will be incremented, so that the bot detection module 118 will create a new entry with the new calculated time window value for subsequently received requests. In this manner, the stale cache entries that are no longer relevant will not be accessed by the bot detection module 118 once the calculated time value is incremented and can be evicted from the tracking cache 120 as they become the least recently accessed entries in the tracking cache 120.

When a user requests a particular database activity a number of times during a preceding duration of time equal to a particular monitoring period that exceeds the allowed number of requests for that monitoring period, the bot detection module 118 requires receiving human verification from the user and/or client device 106 before providing the request to the virtual application 116 and/or database 104. When the bot detection module 118 fails to receive affirmative satisfactory or successful human verification from the user and/or client device 106, in exemplary embodiments, the bot detection module 118 creates or otherwise generates an entry in a blocked user cache 122 coupled to the server 102 via the network 108. In this regard, the entry in the blocked user cache 122 maintains an association between the unverified requesting source and a calculated resumption time value indicating when the user will be allowed to subsequently initiate a database activity. For example, the bot detection module 118 may add, to a current reference time for the server 102, a value indicating an amount of time for which the user should be blocked from initiating activities with respect to the database 104 to obtain the calculated resumption time value and create an entry in the blocked user cache 122 maintaining an association between the calculated resumption time value and the user identifier associated with the database request that triggered the failed human verification test(s). Additionally, in some embodiments, the bot detection module 118 may update the database 104 to indicate the number of times the requesting user has been blocked by the bot detection module 118 for failing the human verification test(s). In this regard, in one or more of these embodiments, a requesting user may be permanently blocked after being temporarily blocked by the bot detection module 118 a certain number of times.

As described in greater detail below in the context of FIGS. 2-3, in exemplary embodiments, when the bot detection module 118 receives a request for a database activity from a client device 106, the bot detection module 118 accesses the tracking cache 120 to confirm that the user of the client device 106 has not requested that database activity more than an allowed number of times for a preceding time interval equal to a monitoring period and accesses the blocked user cache 122 to confirm that the user is not currently blocked from initiating activity with respect to the database 104. When the user is not blocked and has not exceeded the allowed number of requests for a particular monitoring period, the bot detection module 118 provides the request to the virtual application 116 for execution and/or further handling. When the user has met or exceeded the allowed number of requests for a particular monitoring period, the bot detection module 118 initiates one or more human verification tests on the client device 106. When the bot detection module 118 fails to receive an affirmative human verification from the client device 106, the bot detection module 118 creates an entry in the blocked user cache 122 so that the user is temporarily blocked or otherwise prevented from initiating activity with respect to the database 104, and also, the bot detection module 118 updates the database 104 to indicate that the number of times the user has been blocked. If the database 104 indicates that the number of times the user has been blocked exceeds an allowed number of times, the user may be permanently blocked from initiating activity with respect to the database 104, for example, by disabling the user from subsequently logging in to the virtual application 116.

Figure 2:
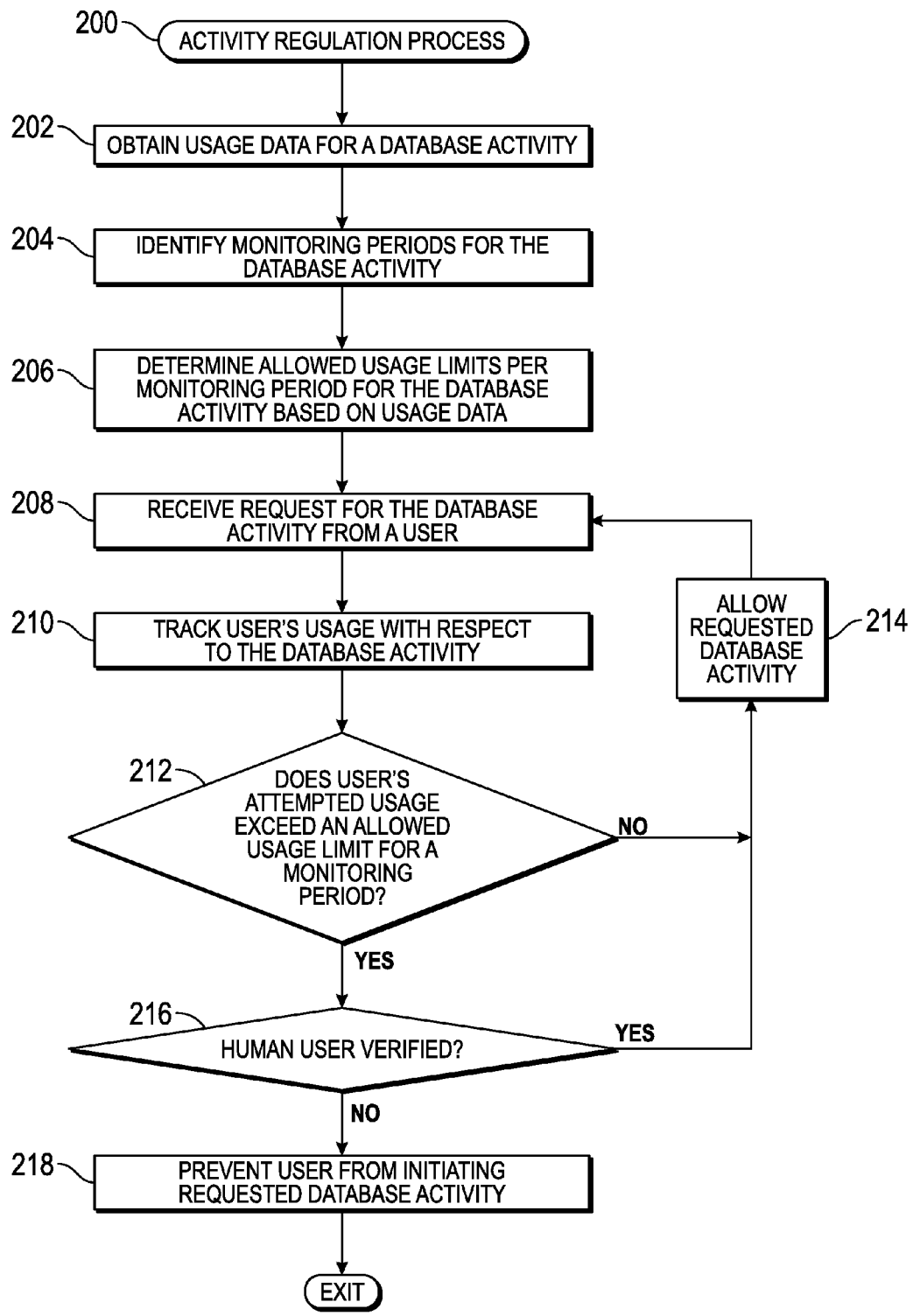
FIG. 2 is a flow diagram of an exemplary activity regulation process suitable for implementation by the computing system of FIG. 1.

FIG. 2 depicts an exemplary embodiment of an activity regulation process 200 suitable for implementation by a computing system, such as computing system 100, to regulate user-initiated activity with respect to a database (e.g., database 104). The various tasks performed in connection with the illustrated process 200 may be performed by software, hardware, firmware, or any combination thereof. For illustrative purposes, the following description may refer to elements mentioned above in connection with FIG. 1. In practice, portions of the activity regulation process 200 may be performed by different elements of the computing system 100, such as, for example, the server 102, the database 104, the application platform 114, the virtual application 116, the bot detection module 118, the tracking cache 120, and/or the blocked user cache 122. It should be appreciated that the activity regulation process 200 may include any number of additional or alternative tasks, the tasks need not be performed in the illustrated order and/or the tasks may be performed concurrently, and/or the activity regulation process 200 may be incorporated into a more comprehensive procedure or process having additional functionality not described in detail herein. Moreover, one or more of the tasks shown and described in the context of FIG. 2 could be omitted from a practical embodiment of the activity regulation process 200 as long as the intended overall functionality remains intact.

Referring to FIG. 2, and with continued reference to FIG. 1, in an exemplary embodiment, the activity regulation process 200 begins by obtaining usage data for a particular database activity to be regulated, identifying one or more desired monitoring periods for enforcing usage limits on that database activity, and determining usage limits for that database activity for each of the identified monitoring periods based on the obtained usage data (tasks 202, 204, 206). In this regard, the identified database activity represents activities an operator of the database 104 and/or server 102 would like to discourage or otherwise prevent from being initiated by bots, web crawlers, scrapers, or other automated systems and/or devices, and the monitoring periods represent the desired time intervals or durations for which the operator of the database 104 and/or server 102 would like to enforce usage limits on that activity. For the identified database activity, the usage data represents the number of requests for that database activity along with information indicating the source (e.g., the user, the IP address, or the like) associated with each of those requests. For example, an operator may like to discourage or otherwise prevent a logged-in user search (or query) of the database 104 from being initiated by bots or web crawlers, wherein the usage data includes the number of logged-in user search requests received by the server 102 over a period of time along with the user identifier associated with each of the search requests. The usage data may also include a timestamp associated with each of the search requests. In accordance with one or more embodiments, the server 102 may store or otherwise maintain the usage data in the database 104 and/or the memory 112 and update the usage data as requests for the database activity are received by the server 102.

After obtaining the usage data for the database activity to be monitored, the usage limits for that database activity are determined based on the identified monitoring periods. In this regard, for each monitoring period, its associated usage limit represents an allowed number of requests per user over a duration of time equal to that monitoring period that are not likely to be exceeded by a human user. For example, if the monitoring period is five minutes, the server 102 and/or the bot detection module 118 may analyze the usage data to determine, for each user for which usage data is available for in the database 104, an average number of search requests over a continuous five minute period. Based on the average number of search requests per user of over the monitoring period, the server 102 and/or the bot detection module 118 calculates or otherwise determines a confidence interval for the average number of search requests per user, with the range of the confidence interval being chosen to achieve a desired tradeoff between the relative percentages of human users included within the range versus the relative percentages of non-human users potentially included within the range. In exemplary embodiments, the server 102 and/or database 104 identifies the upper percentile of the confidence interval as the user usage limit for the monitoring period. For example, the server 102 and/or the bot detection module 118 may calculate or otherwise determine a ninety-five percent confidence interval for the average number of search requests per user over a consecutive five minute period and identify the ninety-fifth percentile as the maximum allowed number of search requests per user over a consecutive five minute monitoring period.

It should be noted that in practice, multiple different monitoring periods may be used for a particular database activity, and the range (or percentage) for the confidence interval used to determine the usage limits may be different for each different monitoring period. For example, in one embodiment, the ninety-eighth percentile may be utilized for a one minute monitoring period, the ninety-fifth percentile may be utilized for a five minute monitoring period, and the ninetieth percentile may be utilized for a five minute monitoring period. In this regard, because human users are less likely to continuously perform a particular database activity over longer periods of time, the confidence intervals may be reduced because human users are less likely to be excluded by the usage limit for that longer monitoring period. In this regard, the range for the various confidence intervals may be optimized or otherwise adjusted by the operator of the server 102 and/or database 104 to achieve a desired tradeoff between the percentage of human users that will fall within the range, the percentage of non-human users that will be excluded by the range, and the percentage of human users that might be excluded by the range. For example, a 99% confidence interval is unlikely to exclude many human users but may also fail to exclude many automated sources (e.g., bots, web crawlers, scrapers or the like), while a 50% confidence interval is likely to exclude a relatively higher percentage of automated sources while also excluding a relatively higher percentage of human users.

Still referring to FIG. 2, after the usage limits are determined, in exemplary embodiments, the activity regulation process 200 continues with receiving requests for the monitored database activity from a source, monitoring or otherwise tracking that source's attempted usage with respect to that database activity, determining whether or not the source's attempted usage with respect to that database activity meets or exceeds the allowed usage limit for a particular monitoring period, and automatically initiating or otherwise allowing the requested database activity when the source's usage has not met or exceeded the allowed usage limit (tasks 208, 210, 212, 214). In this regard, when the server 102 and/or the bot detection module 118 receives a request from the client device 106 and/or client application 107, the server 102 and/or the bot detection module 118 obtains information identifying the source of the request and accesses the blocked user cache 122 to verify that the source is not blocked or otherwise prevented from making the request before accessing the tracking cache 120 to verify that the source has not exceeded any allowed usage limits for any monitoring periods being enforced for that type of request.

For example, the server 102 and/or the bot detection module 118 may receive a search request from the client device 106 (e.g., in response to the user of the client device 106 manipulating a GUI element provided by the virtual application 116), obtain the user identifier for the user of the client device 106, and access the blocked user cache 122 to verify that the user is not blocked before accessing the tracking cache 120 to verify that the user has not exceeded the allowed number of search requests per user for any monitoring periods being enforced for search requests. When the user has not exceeded the allowed number of search requests, the bot detection module 118 automatically allows the search by automatically providing the search request to the virtual application 116, which, in turn, initiates performance of the search request by the database 104 or otherwise continues servicing the search request, for example, by generating a query statement based on information contained in the search request, providing the query statement to the database 104 via the network 108, and generating a graphical representation of the search results retrieved by the database 104 within the client application 107 on the client device 106.

As described above, in one embodiment, in response to receiving a request, the bot detection module 118 generates a cache key for the user based on the user identifier, the type of database activity requested, and a calculated time window value based on a current reference time for the server 102 and the monitoring period being enforced, for example, by appending the user identifier or another value indicative of the source of the request to a value indicative of the type of database activity requested and the calculated time window value (e.g., 'userID_search_calculatedtimewindowvalue'). For example, in one embodiment, for a monitoring period of five minutes, the calculated time value is determined by dividing the current UNIX time for the server 102 by a value corresponding to five minutes (e.g., three hundred thousand milliseconds if the UNIX time is in milliseconds), and taking the quotient modulo 128 to obtain a calculated time window value that is one byte long. If the bot detection module 118 fails to identify an entry in the tracking cache 120 matching the generated key, the bot detection module 118 creates an entry in the tracking cache 120 having the generated key in association with a count value equal to one, thereby indicating it is the user's first search request within the preceding five minutes. For subsequent search requests, the bot detection module 118 accesses the tracking cache 120 and updates the cache entry that matches the cache key generated for that user by incrementing the counted number of search requests. In this regard, by virtue of utilizing the monitoring period to generate the cache key for each respective entry in the tracking cache 120, the counted number of requests associated with any particular cache entry in the tracking cache 120 will include only those requests received during the preceding time interval equal to the monitoring period. Once the monitoring period has elapsed, a new cache key will be generated for that combination of user, database activity, and monitoring period, resulting in a new cache entry with a count value initialized back to one.

Still referring to FIG. 2, when a source's attempted usage with respect to requested database activity meets or exceeds the allowed usage limit for that particular database activity over a particular monitoring period, the activity regulation process 200 continues by verifying or otherwise confirming that the request was initiated by a human (or non-automated) user (task 216). In this regard, when the bot detection module 118 accesses the tracking cache 120 and identifies a count number of requests associated with a cache entry for the particular combination of requesting user and requested database activity meets or exceeds an allowed number of requests for a particular monitoring period, the bot detection module 118 initiates or otherwise provides one or more human verification tests on the client device 106. For example, the server 102 and/or the bot detection module 118 may calculate or otherwise determine a ninety-eighth percent confidence interval for the average number of search requests per user over a consecutive one minute period as 25 search requests or less and identify 25 as the maximum allowed number of search requests per user over a consecutive one minute monitoring period, such that when a user of the client device 106 attempts to search or query the database 104 more than 25 times within the preceding one minute time interval, the bot detection module 118 detects or otherwise identifies that the attempted usage for the requesting user and/or client device 106 exceeds the allowed usage limit. In response, the bot detection module 118 may generate a CAPTCHA interface or another challenge-response test GUI within the client application 107 on the client device 106 that prompts the user of the client device 106 to provide a particular user input that is unlikely to be guessed or otherwise achieved by an automated system, bot, web crawler, or the like. The user of the client device 106 may manipulate the client device 106 and/or the client application 107 to provide a response to the human verification test, wherein in response to determining that the received response to the human verification test represents a correct or satisfactory response, the activity regulation process 200 allows the requested database activity by continuing to service the request (task 214), as described above. Additionally, in some embodiments, the bot detection module 118 may reset the counted number of requests associated with the cache entry that triggered the human verification test in response to receiving the satisfactory human verification response.

When a source attempts to exceed an allowed usage limit for a particular database activity and the activity regulation process 200 fails to verify that the source of the requests for that database activity is a human user, the activity regulation process 200 continues by blocking or otherwise preventing that source from initiating that database activity (task 218). For example, when the bot detection module 118 identifies that a user and/or client device 106 has requested a database activity a number of times that meets or exceeds an allowed number of requests for a particular monitoring period and the bot detection module 118 fails to receive a satisfactory human verification response from that user and/or client device 106 (or alternatively, receives an incorrect or unsatisfactory human verification response from that user and/or client device 106), the bot detection module 118 creates an entry in the blocked user cache 122 that indicates that user and/or client device 106 is not permitted from initiating database activities. For example, the bot detection module 118 may create an entry in the blocked user cache 122 that indicates the user and/or client device 106 being blocked along with a calculated resumption time value indicating when the user and/or client device 106 will be allowed to initiate database activities. In exemplary embodiments, the bot detection module 118 uses the unique identifier associated with the logged-in user of the client device 106 as the cache key for the entry created in the blocked user cache 122. Upon creation of the cache entry, the bot detection module 118 may add, to the current reference time for the server 102, a value indicating a predetermined amount of time for which the user should be blocked from initiating activities with respect to the database 104 to obtain the resumption time value. In this manner, the blocked user cache 122 maintains an association between the user identifier and the timestamp for when that user can resume initiating database activities. In exemplary embodiments, the time to live for entries in the blocked user cache 122 is chosen to be greater than or equal to the amount of time for which the user should be blocked so that the temporary restriction on the violating user's ability to initiate database activities is reliably enforced.

In exemplary embodiments, when the bot detection module 118 fails to receive a successful human verification from the client device 106, the bot detection module 118 also updates the database 104 to indicate a number of times that particular user and/or client device 106 has failed a human verification test and been blocked. In this manner, the bot detection module 118 may permanently block a user from initiating database activities once the user has been temporarily blocked a certain number of times. For example, when the user subsequently attempts to login to the virtual application 116, the bot detection module 118 and/or the virtual application 116 may identify that that user has been temporarily blocked a number of times that meets or exceeds an allowed number, so that the user is prevented from subsequently logging-in to the virtual application 116 or otherwise initiating subsequent database activities via the virtual application 116.

In accordance with one or more embodiments, the activity regulation process 200 may periodically or continuously obtain updated usage data for a requested database activity to dynamically re-determine usage limits for the requested database activity (e.g., by periodically repeating tasks 202, 204, 206). For example, as requests are received by the bot detection module 118 and/or the virtual application 116, the application platform 114 may update the database 104 to track the number of requests for various database activities along with the source (e.g., the user, the IP address, or the like) associated with each of those requests and a timestamp indicating when each respective request was made. Additionally, bot detection module 118 may update the database 104 to maintain information pertaining to the human verification tests initiated by the bot detection module 118, such as, for example, the combination of monitoring period and type of database activity requested that triggered the respective human verification test along with the result of the human verification test. Based on the updated usage data along with the performance of the human verification tests, the server 102 and/or the bot detection module 118 may identify which allowed usage limits may be too restrictive (e.g., based on the ratio of successful human verifications to failed human verifications being greater than a desired rate) or too relaxed (e.g., based on the ratio of failed human verifications to successful human verifications being greater than a desired amount) and adjust the percentages for the confidence interval accordingly to ensure that the allowed usage limits are operating in a manner that achieves the desired tradeoff between preventing or otherwise discouraging automated database activity while minimizing the impact on legitimate human users.

Figure 3:
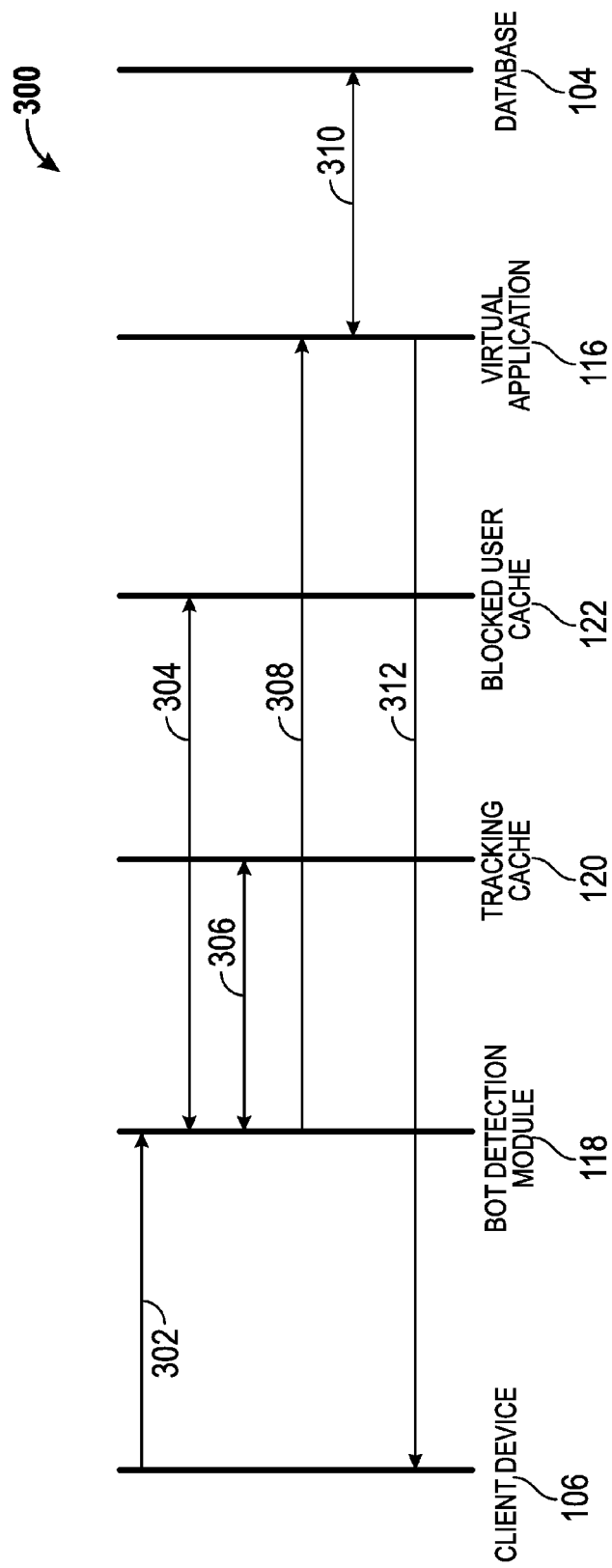
FIG. 3 is a diagram illustrating a sequence of communications within the computing system of FIG. 1 in accordance with one exemplary embodiment of the activity regulation process of FIG. 2.

FIG. 3 illustrates an exemplary sequence 300 of communications within the computing system 100 in accordance with an exemplary embodiment of the activity regulation process 200 of FIG. 2 for the scenario where the source of a database activity request has not met or exceeded any allowed usage limit for that requested database activity. Referring to FIG. 3, and with continued reference to FIGS. 1-2, the illustrated sequence 300 begins with the client device 106 contacting the server 102 and providing 302 a request for a particular activity with respect to the database 104, such as, for example, a login request, a search request, or the like. In response to receiving the request, the bot detection module 118 obtains information identifying the source of the request (e.g., a user identifier associated with the request, a network address, or the like) and accesses the blocked user cache 122 to determine whether the user and/or the client device 106 is blocked or otherwise prevented from initiating the requested database activity. When the bot detection module 118 fails to identify an entry in the blocked user cache 122 that matches the user identifier associated with or otherwise accompanying the request, the bot detection module 118 generates a cache key based on the combination of the requested database activity, a monitoring period for that activity, and the source of the request and accesses 306 the tracking cache 120 to determine whether the user and/or the client device 106 is attempting to exceed an allowed number of requests for that database activity over a duration of time equal to the monitoring period. For example, as described above, the bot detection module 118 generates the cache key by appending the user identifier, the requested database activity, and a time value calculated based at least in part on the current reference time for the server 102 and the monitoring period. If the bot detection module 118 fails to identify an entry matching the generated cache key, the bot detection module 118 creates an entry in the tracking cache 120 having the generated cache key and an initial value for a counted number of requests equal to one. Conversely, if the bot detection module 118 identifies an entry matching the generated cache key, the bot detection module 118 increments the counted number of requests associated with that entry by one and confirms that the counted number of requests does not exceed an allowed number of requests for the monitoring period used to generate the cache key. It should be noted that when multiple different monitoring time periods are used for a particular database activity, the bot detection module 118 generates multiple cache keys and creates multiple entries in the tracking cache 120 for that combination of user identifier and requested database activity, with each of those entries in the tracking cache 120 corresponding to a different monitoring period.

When the bot detection module 118 determines that the user and/or the client device 106 has not exceeded the allowed number of requests for a particular database activity for any particular monitoring period being enforced for that database activity, the bot detection module 118 allows the user and/or the client device 106 to initiate the database activity by providing 308 the request to the virtual application 116. In response, the virtual application 116 utilizes the information contained in or otherwise accompanying the request to access 310 the database 104 and perform the database activity in accordance with the request from the user and/or client device 106. Thereafter, the virtual application 116 generates or otherwise provides 312 a graphical representation of the result of performing the database activity to the client device 106. For example, if the request corresponds to a login request, the virtual application 116 may verify the authentication information contained in the request matches a particular user record maintained in the database 104, retrieve metadata and/or other user-specific information maintained in association with that user record (e.g., user preferences or the like), and utilize the metadata and/or user-specific information to generate a GUI for a home page or landing page for the virtual application 116 within the client application 107 on the client device 106. If the request corresponds to a search request, the virtual application 116 may query the database 104 in accordance with the keywords and/or other search parameters provided by the client device 106, retrieve information and/or data from records in the database 104 that match at least a portion of the received keywords and/or search parameters, and utilize that information and/or data to generate a GUI that includes a listing of the search results within the client application 107 on the client device 106.

The sequence 300 in FIG. 3 is repeated for subsequent requests from a user when the attempted usage with respect to the database activity has not exceeded the allowed usage. For example, a previously authenticated logged-in user may subsequently provide 302 a logged-in user search request (which may provide more robust search results than an anonymous user search request) to the server 102, wherein the bot detection module 118 accesses the blocked user cache 122 to confirm the user is not blocked or otherwise prevented from initiating the database searches before generating a cache key based on the combination of the user's unique identifier, the search request, and the current reference time for the server 102 and accesses 306 the tracking cache 120 to increment the counted number of search requests from that logged-in user before providing 308 the search request to the virtual application 116. Thereafter, the virtual application 116 and/or application platform 114 accesses 310 the database to obtain the information and/or data corresponding to the results of the search and provides 312 the search results to the logged-in user, as described above.

Figure 4:
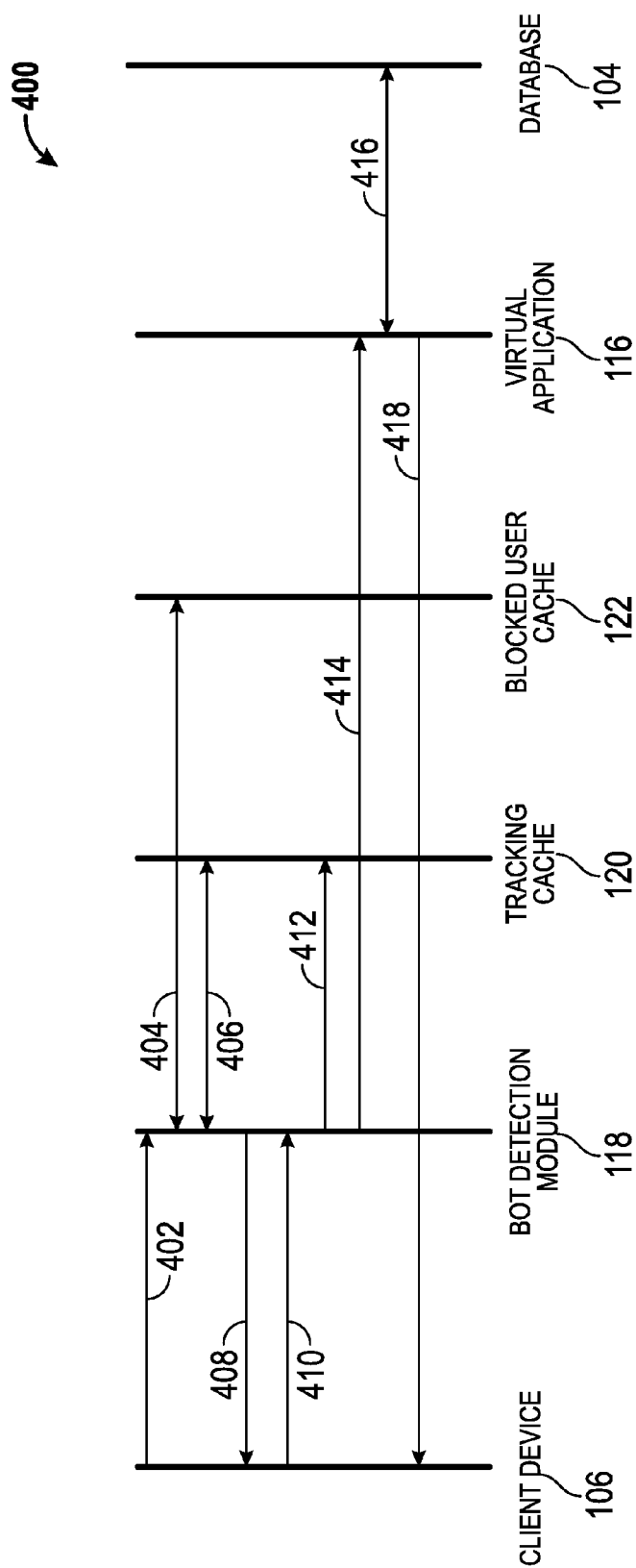
FIG. 4 is a diagram illustrating another sequence of communications within the computing system of FIG. 1 in accordance with one exemplary embodiment of the activity regulation process of FIG. 2.

FIG. 4 illustrates an exemplary sequence 400 of communications within the computing system 100 in accordance with an exemplary embodiment of the activity regulation process 200 of FIG. 2 for the scenario where the source of a database activity request has met or exceeded an allowed usage limit for that requested database activity but provides a successful human verification response. Referring to FIG. 4, and with continued reference to FIGS. 1-2, the illustrated sequence 400 begins with the client device 106 contacting the server 102 and providing 402 a request for a particular activity with respect to the database 104 and the bot detection module 118 accessing 404 the blocked user cache 122 to confirm that the user and/or the client device 106 is not blocked or otherwise prevented from initiating the requested database activity. As described above, the bot detection module 118 generates a cache key based on the combination of the requested database activity, a monitoring period for that activity, and the source of the request and accesses 406 the tracking cache 120 to determine whether the user and/or the client device 106 is attempting to exceed an allowed number of requests for that database activity over a duration of time equal to the monitoring period. When a counted number of requests associated with the cache key exceeds the allowed number of requests for the monitoring period used to generate that cache key, the bot detection module 118 initiates, generates, or otherwise provides 408 a human verification test to the client device 106. For example, as described above, the bot detection module 118 may generate a CAPTCHA interface or a GUI for another human verification test within the client application 107 on the client device 106. Thereafter, the bot detection module 118 receives 410 a response to the human verification test from the client device 106, for example, in response to the user of the client device 106 manipulating the GUI elements within the client application 107 to provide a response.

When the bot detection module 118 identifies or otherwise determines that the human verification response received from the client device 106 is correct or otherwise satisfactory, the bot detection module 118 updates 412 the tracking cache 120 by resetting or otherwise reinitializing the counted number of requests associated with the cache entry that triggered the human verification test and allows the user and/or the client device 106 to initiate the database activity by providing 414 the request to the virtual application 116. As described above, the virtual application 116 utilizes the information contained in or otherwise accompanying the request to access 416 the database 104 and perform the database activity in accordance with the request from the user and/or client device 106, and thereafter, generate or otherwise provide 418 a graphical representation of the result of performing the database activity to the client device 106.

Figure 5:
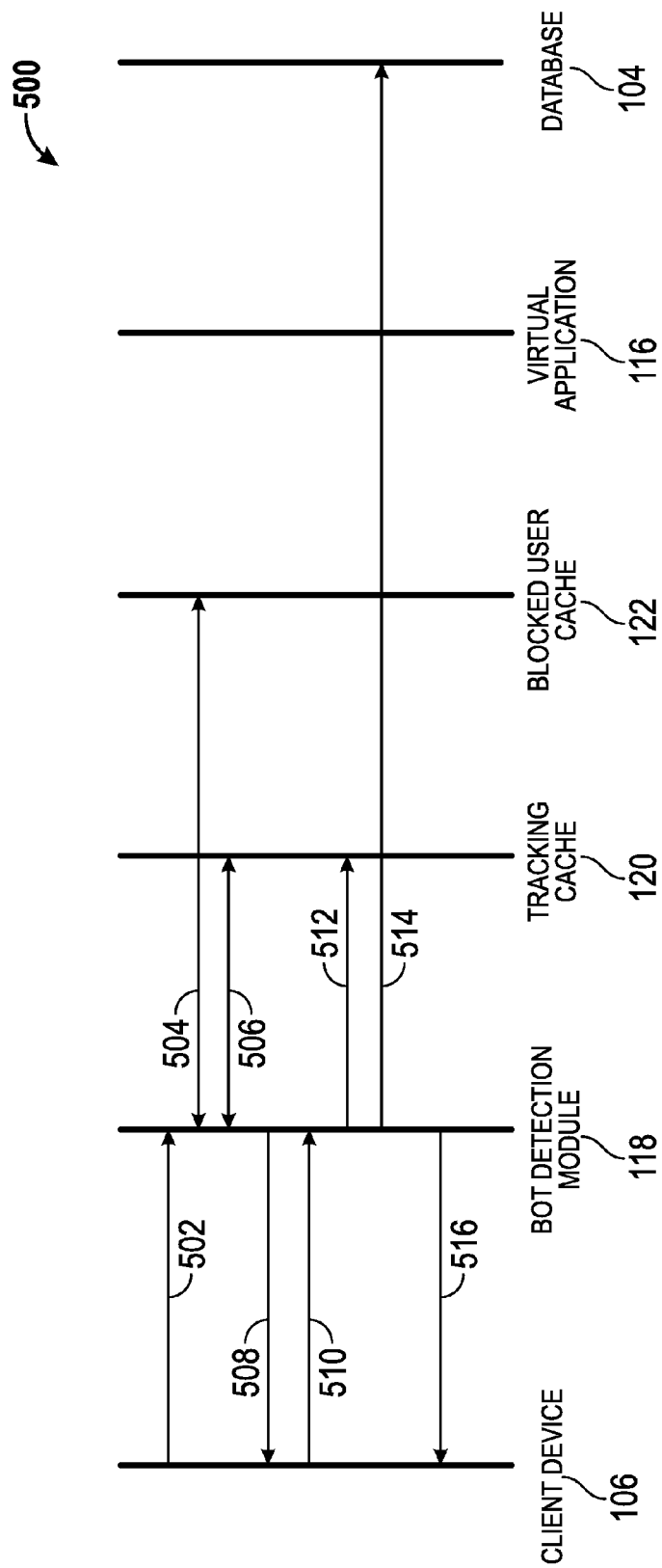
FIG. 5 is a diagram illustrating another sequence of communications within the computing system of FIG. 1 in accordance with one exemplary embodiment of the activity regulation process of FIG. 2.

FIG. 5 illustrates another exemplary sequence 500 of communications within the computing system 100 in accordance with an exemplary embodiment of the activity regulation process 200 of FIG. 2 for the scenario where the source of a database activity request has met or exceeded an allowed usage limit for that requested database activity and fails to provide a successful human verification response. Referring to FIG. 5, and with continued reference to FIGS. 1-2, the illustrated sequence 500 begins with the client device 106 providing 502 a request for a particular activity with respect to the database 104 and the bot detection module 118 receiving the request and accessing 504 the blocked user cache 122 to confirm that the user and/or the client device 106 is not blocked or otherwise prevented from initiating the requested database activity. As described above, the bot detection module 118 generates a cache key based on the combination of the requested database activity, a monitoring period for that activity, and the source of the request and accesses 506 the tracking cache 120 and identifies a counted number of requests associated with the cache key exceeds the allowed number of requests for the monitoring period used to generate that cache key. Thereafter, the bot detection module 118 initiates, generates, or otherwise provides 508 a human verification test to the client device 106.

In the illustrated sequence 500 of FIG. 5, the bot detection module 118 receives 510 an incorrect or otherwise unsatisfactory response to the human verification test from the client device 106. In response to the failure to receive a satisfactory human verification, the bot detection module 118 accesses 512 the blocked user cache 122 to indicate that the user is blocked or otherwise prevented from initiating database activity. As described above, in exemplary embodiments, the bot detection module 118 calculates a time value representative of when the user is allowed to resume initiating database activity, so that the user is only temporarily blocked from accessing the database 104. For example, the bot detection module 118 may calculate the time value by obtaining the current reference time for the server 102 (e.g., the current UNIX time) and adding a predetermined value chosen by the operator of the computing system 100 that represents the amount of time that the user should be temporarily prevented from initiating, such that the sum of the current reference time and this predetermined value indicates the future UNIX time after which the user may resume initiating database activities.

In exemplary embodiments, the bot detection module 118 also updates 514 the database 104 to indicate that the number of times that user has been temporarily blocked for exceeding an allowed usage limit for a monitoring period and failing a human verification test. For example, the database 104 may maintain a record associated with that user's unique user identifier that includes a field or column indicating the number of times that user has been blocked, wherein the bot detection module 118 accesses the database 104 to increment the value in that field or column so that the record accurately reflects the number of times the user has been blocked by the bot detection module 118. In some embodiments, the bot detection module 118 may modify or otherwise update the user's record in the database 104 to permanently block the user if the number of times the user has been temporarily blocked exceeds a threshold amount. For example, the operator of the computing system 100 may determine that once a user has been temporarily blocked five times, that the user should no longer be allowed to login or otherwise access the database 104. In one embodiment, when the bot detection module 118 identifies that the field of the user's database record indicates that this is the fifth time the user has been blocked (e.g., after incrementing the previous value for that field), the bot detection module 118 may update another field or column of the user's record in the database 104 to indicate that login for that user should be disabled. Thereafter, when that user attempts to login to the virtual application 116 at some point in time after the calculated time value associated with the cache entry for the user in the blocked user cache 122, the virtual application 116 accesses the database 104, identifies that login for that user is disabled and rejects or otherwise refuses the login.

Still referring to FIG. 5, after determining that the user and/or client device 106 should be blocked from initiating database activity, the bot detection module 118 may generate or otherwise provide 516 a GUI within the client application 107 on the client device 106 that indicates that the user is being blocked from initiating database activity. The GUI generated by the bot detection module 118 within the client application 107 may include contact information (e.g., a phone number or the like) for customer service or technical support affiliated with the operator of the computing system 100 that the user of the client device 106 may utilize to contact the operator of the computing system 100 and allow the user of the client device 106 to be verified or authenticated as being a human user by the operator of the computing system 100, at which point, the operator of the computing system 100 may modify the entries associated with the user in the blocked user cache 122 and/or the database 104 to allow the user to resume initiating activity with respect to the database 104.

Referring to FIGS. 1-5, in some embodiments, the bot detection module 118 may also track or otherwise monitor the number of times a human verification test has been provided to a particular source of requests, and temporarily and/or permanently block that source from initiating the requested database activity when the number of times the human verification test has been provided over a particular time interval exceeds a threshold number. For example, to prevent crowd-sourced solutions to human verification tests, when a user has met or exceeded an allowed number of requests for a particular monitoring period, the bot detection module 118 may access the database 104 to confirm that a number of times the user has been prompted with a human verification test does not exceed a threshold number of human verification tests. When the number of times the user has been prompted with a human verification test is less than the threshold number, the bot detection module 118 updates the database 104 to indicate the number of times the user has been prompted with a human verification test before providing a human verification test to the user. When the database 104 indicates that the number of times the user has been prompted with a human verification test exceeds the threshold number, the user may be temporarily blocked from initiating activity with respect to the database 104 in a similar manner as if the user had failed to provide a satisfactory human verification response, for example, by creating an entry in the blocked user cache 122 and updating the database 104 to indicate that the number of times the user has been blocked. In this manner, a user persistently triggering human verification tests in a manner that is indicative of automated activity in conjunction with crowd-sourced human verification responses may be temporarily and/or permanently blocked from initiating activity with respect to the database 104. In some embodiments, rate limits may be enforced for the human verification tests in a similar manner as described above, for example, by providing different threshold amounts for the allowed number of times a human verification test may be provided to a particular user for different monitoring periods, thereby minimizing the likelihood of a legitimate user being temporarily and/or permanently blocked based on the number of times that user's legitimate requests have resulted in a human verification test.

Figure 6:
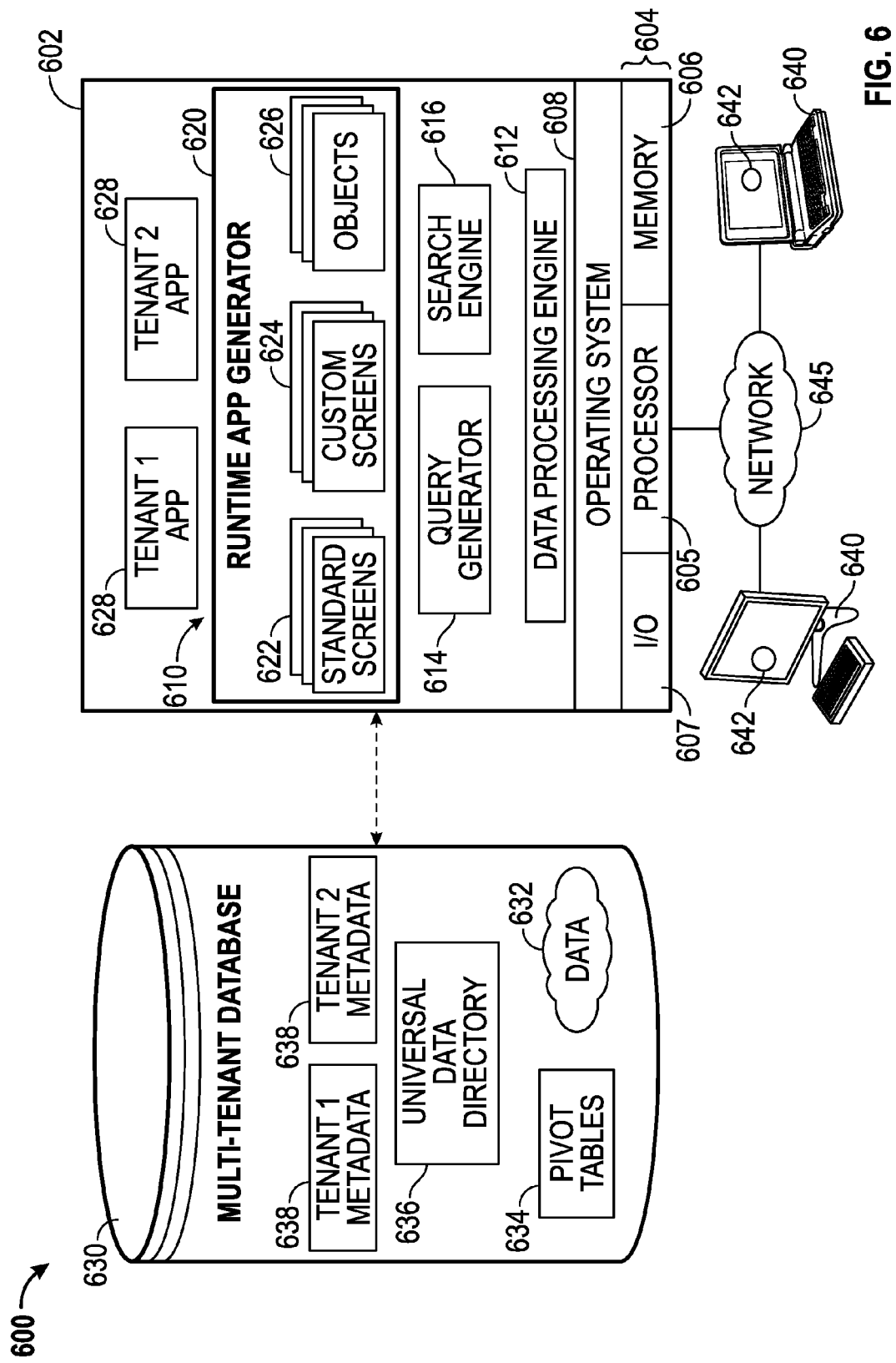
FIG. 6 is a block diagram of an exemplary multi-tenant system suitable for use in the computing system of FIG. 1 in accordance with one or more exemplary embodiments.

FIG. 6 depicts a multi-tenant system 600 suitable for use in the computing system 100 of FIG. 1 in accordance with one embodiment. The illustrated multi-tenant system 600 of FIG. 6 includes a server 602 (e.g., server 102) that dynamically creates and supports virtual applications 628 (e.g., virtual application 116) based upon data 632 from a common database 630 (e.g., database 104) that is shared between multiple tenants, alternatively referred to herein as a multi-tenant database. Data and services generated by the virtual applications 628 are provided via a network 645 (e.g., network 108) to any number of client devices 640 (e.g., application server 102, client device 106, or the like), as desired. Each virtual application 628 is suitably generated at run-time (or on-demand) using a common application platform 610 (e.g., application platform 114) that securely provides access to the data 632 in the database 630 for each of the various tenants subscribing to the multi-tenant system 600. In accordance with one non-limiting example, the multi-tenant system 600 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 630. In this regard, each tenant includes one or more users associated with, assigned to, or otherwise belonging to that respective tenant. To put it another way, each respective user within the multi-tenant system 600 is associated with, assigned to, or otherwise belongs to a particular tenant of the plurality of tenants supported by the multi-tenant system 600. Tenants may represent customers, customer departments, business or legal organizations, and/or any other entities that maintain data for particular sets of users within the multi-tenant system 600 (i.e., in the multi-tenant database 630). For example, the application server 602 may be associated with one or more tenants supported by the multi-tenant system 600. Although multiple tenants may share access to the server 602 and the database 630, the particular data and services provided from the server 602 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 632 belonging to or otherwise associated with other tenants.

The multi-tenant database 630 is any sort of repository or other data storage system capable of storing and managing the data 632 associated with any number of tenants. The database 630 may be implemented using any type of conventional database server hardware. In various embodiments, the database 630 shares processing hardware 604 with the server 602. In other embodiments, the database 630 is implemented using separate physical and/or virtual database server hardware that communicates with the server 602 to perform the various functions described herein. In an exemplary embodiment, the database 630 includes a database management system or other equivalent software capable of determining an optimal query plan for retrieving and providing a particular subset of the data 632 to an instance of virtual application 628 in response to a query initiated or otherwise provided by a virtual application 628. The multi-tenant database 630 may alternatively be referred to herein as an on-demand database, in that the multi-tenant database 630 provides (or is available to provide) data at run-time to on-demand virtual applications 628 generated by the application platform 610.

In practice, the data 632 may be organized and formatted in any manner to support the application platform 610. In various embodiments, the data 632 is suitably organized into a relatively small number of large data tables to maintain a semi-amorphous "heap"-type format. The data 632 can then be organized as needed for a particular virtual application 628. In various embodiments, conventional data relationships are established using any number of pivot tables 634 that establish indexing, uniqueness, relationships between entities, and/or other aspects of conventional database organization as desired. Further data manipulation and report formatting is generally performed at run-time using a variety of metadata constructs. Metadata within a universal data directory (UDD) 636, for example, can be used to describe any number of forms, reports, workflows, user access privileges, business logic and other constructs that are common to multiple tenants. Tenant-specific formatting, functions and other constructs may be maintained as tenant-specific metadata 638 for each tenant, as desired. Rather than forcing the data 632 into an inflexible global structure that is common to all tenants and applications, the database 630 is organized to be relatively amorphous, with the pivot tables 634 and the metadata 638 providing additional structure on an as-needed basis. To that end, the application platform 610 suitably uses the pivot tables 634 and/or the metadata 638 to generate "virtual" components of the virtual applications 628 to logically obtain, process, and present the relatively amorphous data 632 from the database 630.

The server 602 is implemented using one or more actual and/or virtual computing systems that collectively provide the dynamic application platform 610 for generating the virtual applications 628. For example, the server 602 may be implemented using a cluster of actual and/or virtual servers operating in conjunction with each other, typically in association with conventional network communications, cluster management, load balancing and other features as appropriate. The server 602 operates with any sort of conventional processing hardware 604, such as a processor 605, memory 606, input/output features 607 and the like. The input/output features 607 generally represent the interface(s) to networks (e.g., to the network 645, or any other local area, wide area or other network), mass storage, display devices, data entry devices and/or the like. The processor 605 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 606 represents any non-transitory short or long term storage or other computer-readable media capable of storing programming instructions for execution on the processor 605, including any sort of random access memory (RAM), read only memory (ROM), flash memory, magnetic or optical mass storage, and/or the like. The computer-executable programming instructions, when read and executed by the server 602 and/or processor 605, cause the server 602 and/or processor 605 to create, generate, or otherwise facilitate the application platform 610 and/or virtual applications 628 and perform one or more additional tasks, operations, functions, and/or processes described herein. It should be noted that the memory 606 represents one suitable implementation of such computer-readable media, and alternatively or additionally, the server 602 could receive and cooperate with external computer-readable media that is realized as a portable or mobile component or application platform, e.g., a portable hard drive, a USB flash drive, an optical disc, or the like.

The application platform 610 is any sort of software application or other data processing engine that generates the virtual applications 628 that provide data and/or services to the client devices 640. In a typical embodiment, the application platform 610 gains access to processing resources, communications interfaces and other features of the processing hardware 604 using any sort of conventional or proprietary operating system 608. The virtual applications 628 are typically generated at run-time in response to input received from the client devices 640. For the illustrated embodiment, the application platform 610 includes a bulk data processing engine 612, a query generator 614, a search engine 616 that provides text indexing and other search functionality, and a runtime application generator 620. Each of these features may be implemented as a separate process or other module, and many equivalent embodiments could include different and/or additional features, components or other modules as desired.

The runtime application generator 620 dynamically builds and executes the virtual applications 628 in response to specific requests received from the client devices 640. The virtual applications 628 are typically constructed in accordance with the tenant-specific metadata 638, which describes the particular tables, reports, interfaces and/or other features of the particular application 628. In various embodiments, each virtual application 628 generates dynamic web content that can be served to a browser or other client program 642 associated with its client device 640, as appropriate.

The runtime application generator 620 suitably interacts with the query generator 614 to efficiently obtain multi-tenant data 632 from the database 630 as needed in response to input queries initiated or otherwise provided by users of the client devices 640. In a typical embodiment, the query generator 614 considers the identity of the user requesting a particular function (along with the user's associated tenant), and then builds and executes queries to the database 630 using system-wide metadata 636, tenant specific metadata 638, pivot tables 634, and/or any other available resources. The query generator 614 in this example therefore maintains security of the common database 630 by ensuring that queries are consistent with access privileges granted to the user and/or tenant that initiated the request. In this manner, the query generator 614 suitably obtains requested subsets of data 632 accessible to a user and/or tenant from the database 630 as needed to populate the tables, reports or other features of the particular virtual application 628 for that user and/or tenant.

Still referring to FIG. 6, the data processing engine 612 performs bulk processing operations on the data 632 such as uploads or downloads, updates, online transaction processing, and/or the like. In many embodiments, less urgent bulk processing of the data 632 can be scheduled to occur as processing resources become available, thereby giving priority to more urgent data processing by the query generator 614, the search engine 616, the virtual applications 628, etc.

In exemplary embodiments, the application platform 610 is utilized to create and/or generate data-driven virtual applications 628 for the tenants that they support. Such virtual applications 628 may make use of interface features such as custom (or tenant-specific) screens 624, standard (or universal) screens 622 or the like. Any number of custom and/or standard objects 626 may also be available for integration into tenant-developed virtual applications 628. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 632 associated with each virtual application 628 is provided to the database 630, as appropriate, and stored until it is requested or is otherwise needed, along with the metadata 638 that describes the particular features (e.g., reports, tables, functions, objects, fields, formulas, code, etc.) of that particular virtual application 628. For example, a virtual application 628 may include a number of objects 626 accessible to a tenant, wherein for each object 626 accessible to the tenant, information pertaining to its object type along with values for various fields associated with that respective object type are maintained as metadata 638 in the database 630. In this regard, the object type defines the structure (e.g., the formatting, functions and other constructs) of each respective object 626 and the various fields associated therewith.

Still referring to FIG. 6, the data and services provided by the server 602 can be retrieved using any sort of personal computer, mobile telephone, tablet or other network-enabled client device 640 on the network 645. In an exemplary embodiment, the client device 640 includes a display device, such as a monitor, screen, or another conventional electronic display capable of graphically presenting data and/or information retrieved from the multi-tenant database 630. Typically, the user operates a conventional browser application or other client program 642 executed by the client device 640 to contact the server 602 via the network 645 using a networking protocol, such as the hypertext transport protocol (HTTP) or the like. The user typically authenticates his or her identity to the server 602 to obtain a session identifier ("SessionID") that identifies the user in subsequent communications with the server 602. When the identified user requests access to a virtual application 628, the runtime application generator 620 suitably creates the application at run time based upon the metadata 638, as appropriate. As noted above, the virtual application 628 may contain Java, ActiveX, or other content that can be presented using conventional client software running on the client device 640; other embodiments may simply provide dynamic web or other content that can be presented and viewed by the user, as desired.

The subject matter described herein allows for usage limits to be enforced for logged-in users in a manner that effectively prevents or otherwise discourages prolonged automated activity by bots, scrapers, web crawlers or other automated systems without unduly impacting the user experience for legitimate human users. For example, logged-in users may have access to more robust search functionality and/or other enhanced features not available to anonymous users, wherein usage rate limits enforced for those features and/or functionalities may be determined based on empirical usage data using confidence intervals chosen so that most logged-in users will be allowed to utilize those features and/or functionalities without encountering any human verification tests. In this regard, the confidence intervals and monitoring periods may be configured to minimize the impact on legitimate human users while restricting the rate at which the features and/or functionalities can be utilized by automated sources, thereby reducing the computational resources consumed by automated sources and impairing the ability of the automated sources to gather information and/or data.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to web crawling, expression matching, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of regulating access to a database by a server coupled to the database, the method comprising:
    receiving, by the server, one or more requests for an activity;
    determining, by the server, a number of requests for the activity received from a source of the one or more requests during a monitoring period, wherein determining the number of requests comprises:
        generating a cache key based at least in part on the activity, the source, and the monitoring period; and
        accessing a cache coupled to the server to obtain a counted number of requests for the activity associated with an entry in the cache matching the cache key;
    automatically initiating, by the server, the activity with respect to the database when the number is less than an allowed number of requests for the activity for the monitoring period; and
    providing, by the server to the source, a human verification test when the number of requests exceeds the allowed number of requests for the activity for the monitoring period, wherein the server continues servicing the one or more requests for the activity with respect to the database in response to receiving a satisfactory response to the human verification test from the source.

2. The method of claim 1, further comprising authenticating, by the server, the source prior to receiving the one or more requests.

3. The method of claim 2, wherein authenticating the source comprises verifying login information for a user of a client device coupled to the server via the network matches stored login information associated with the user in the database, the one or more requests being received from the client device.

4. The method of claim 1, wherein the number of requests comprise the counted number of requests for the activity received from the source during a preceding time interval equal to the monitoring period, wherein:
the server automatically initiates the activity with respect to the database when the counted number is less than an allowed number of requests for the activity for the monitoring period; and
the server provides the human verification test to the source when the counted number is greater than the allowed number of requests.

5. The method of claim 1, wherein generating the cache key comprises:
calculating a window value based on a current reference time for the server and the monitoring period; and
appending the window value to a first value indicative of the activity and a second value indicative of the source.

6. The method of claim 5, wherein calculating the window value comprises:
dividing the current reference time for the server by the monitoring period to obtain a quotient; and
performing a modulus operation on the quotient, wherein the window value comprises a residue of the modulus operation.

7. The method of claim 1, further comprising:
incrementing the counted number of requests; and
after incrementing the counted number:
providing, by the server, the human verification test to the source when the counted number exceeds an allowed number of requests for the activity for the monitoring period; and
initiating, by the server, the activity with respect to the database in response to receiving, from the source, the satisfactory response to the human verification test.

8. The method of claim 1, further comprising preventing the activity with respect to the database on behalf of the source in response to receiving an unsatisfactory response to the human verification test from the source when the number of requests exceeds the allowed number of requests.

9. The method of claim 8, wherein preventing the activity comprises:
calculating a time value indicative of when the source can resume initiating the activity with respect to the database based on a current reference time for the server; and
creating an entry in a cache coupled to the server, wherein the entry maintains an association between the source and the time value.

10. The method of claim 8, wherein preventing the activity comprises updating a database record associated with the source and maintained by the database to indicate the source has been prevented from initiating the activity.

11. The method of claim 1, further comprising:
receiving, by the server, a plurality of requests for the activity from a plurality of sources;
determining a confidence interval for a number of requests per source over the monitoring period based on the plurality of requests; and
determining an upper limit of the confidence interval as the allowed number of requests for the activity for the monitoring period.

12. The method of claim 11, the number of requests comprising the counted number of requests for the activity received from the source during a preceding time interval equal to the monitoring period, wherein:
the server automatically initiates the activity with respect to the database when the counted number is less than the allowed number of requests; and
the server provides the human verification test to the source when the counted number is greater than the allowed number of requests.

13. The method of claim 1, further comprising determining, by the server, a second number of requests for the activity received from the source of the one or more requests during a second monitoring period, the second monitoring period being different from the first monitoring period, wherein:
the server provides the human verification test to the source when the number of requests exceeds the allowed number of requests for the monitoring period or the second number of requests exceeds a second allowed number of requests for the second monitoring period; and
the server initiates the activity with respect to the database in response to receiving the satisfactory response.

14. A computing system comprising:
a database;
a server coupled to the database to receive, from a source via a network, one or more requests for an activity, determine a counted number of requests by the source for the activity over a preceding time interval equal to a monitoring period exceeds an allowed number of requests for the activity for the monitoring period, and when the counted number of requests exceeds the allowed number of requests for the activity for the monitoring period, initiate the activity with respect to the database in response to receiving human verification from the source; and
a cache coupled to the server via the network, the server generating a cache key for an entry in the cache based at least in part on the activity, the source, and the monitoring period and the server accessing the cache utilizing the cache key to obtain the counted number of requests associated with the entry, the entry maintaining an association between the source and the counted number of requests for the activity by the source over the preceding time interval equal to the monitoring period.

15. The computing system of claim 14, wherein the allowed number of requests comprises an upper limit of a confidence interval for a number of requests per source over the monitoring period determined based on a plurality of requests received from a plurality of sources.

16. The computing system of claim 14, wherein the source comprises a user of a client device coupled to the network, the user being authenticated based on login information received from the client device prior to receiving the one or more requests.

17. A computer-readable medium comprising computer-executable instructions that, when executed by a processing system, cause the processing system to:
determine a number of requests for an activity with respect to a database received from a source during a monitoring period in response to receiving one or more requests for the activity from the source by:
generating a cache key based at least in part on the activity, the source, and the monitoring period; and
accessing a cache to obtain a counted number of requests for the activity associated with an entry in the cache matching the cache key;
automatically initiate the activity with respect to the database when the number is less than an allowed number of requests for the activity for the monitoring period; and
initiate the activity with respect to the database in response to receiving human verification from the source when the number of request exceeds the allowed number of requests for the activity for the monitoring period.

18. The computer-readable medium of claim 17, wherein:
the source comprises a previously authenticated user of a client device coupled to the processing system via a network; and
the allowed number of requests comprises an upper limit of a confidence interval for a number of requests per source over the monitoring period, the confidence interval being determined based on a plurality of requests received by the processing system via the network from a plurality of sources.

* * * * *